(12) United States Patent
Kuhn et al.

(10) Patent No.: US 12,205,427 B2
(45) Date of Patent: Jan. 21, 2025

(54) COMPENSATING ELEMENT WITH RELATIVE POSITION DISPLAY

(71) Applicant: Robert Bosch GmbH, Stuttgart (DE)

(72) Inventors: Efim Kuhn, Grettstadt (DE); Andreas Rueb, Tamm (DE); David Geissler, Sandberg (DE); Fan Yang, Blaustein (DE); Floria Krusche, Stadthagen (DE); Markus Groganz, Wasserlosen (DE); Michael Danzberger, Zeilitzheim (DE); Peter Schlegel, Obernzenn (DE); Sebastian Siedler, Obernzenn (DE); Thomas Dickmann, Ulm (DE); Tobias Wolf, Elfershausen (DE)

(73) Assignee: Robert Bosch GmbH, Stuttgart (DE)

( * ) Notice: Subject to any disclaimer, the term of this patent is extended or adjusted under 35 U.S.C. 154(b) by 454 days.

(21) Appl. No.: 17/736,568

(22) Filed: May 4, 2022

(65) Prior Publication Data
US 2022/0366748 A1  Nov. 17, 2022

(30) Foreign Application Priority Data
May 11, 2021 (DE) ..................... 10 2021 204 730.0

(51) Int. Cl.
*B25J 19/00* (2006.01)
*B25J 17/02* (2006.01)
(Continued)

(52) U.S. Cl.
CPC ...... *G07C 9/00944* (2013.01); *B25J 17/0208* (2013.01); *B25J 19/00* (2013.01); *E05B 9/04* (2013.01); *G07C 2009/00952* (2013.01)

(58) Field of Classification Search
CPC ....... G07C 9/00944; G07C 2009/00952; B25J 17/0208; B25J 19/00; B25J 19/02;
(Continued)

(56) References Cited

U.S. PATENT DOCUMENTS 6,418,629 B1 * 7/2002 Oh .................. G01B 21/22
  33/1 PT
10,011,019 B1 * 7/2018 Strauss .................. B25J 15/022
(Continued)

FOREIGN PATENT DOCUMENTS

DE   10 2015 214 003 A1   1/2017
DE   10 2015 219 332 A1   4/2017

OTHER PUBLICATIONS

Wikipedia Article entitled "Opazität"; (https://de.wikipedia.org/wiki/Opazit%C3%A4t); 5 pages (one page in English langauge and four pages in German language); Published at least as early as May 3, 2022.

*Primary Examiner* — T. Scott Fix
(74) *Attorney, Agent, or Firm* — Maginot, Moore & Beck LLP

(57) ABSTRACT

A compensating element having first and second modules is disclosed. A locking mechanism which can be switched between a first and a second operating state is provided. The first module is connected firmly to the second module in the first operating state. The first operating state defines a zero position between the first and the second module. The first and the second module are connected to one another in the second operating state by a spring mechanism in such a way that they are movable relative to one another. The compensating element has a midaxis, and the first and the second module are arranged at least partially next to one another in the direction of the midaxis. A measuring system is also disclosed with which the relative position between the first and the second module can be measured. The first or second module includes an externally visible luminous surface. A luminous state of the luminous surface is dependent on the relative position measured by the measuring system.

10 Claims, 3 Drawing Sheets

(51) Int. Cl.
*E05B 9/04* (2006.01)
*G07C 9/00* (2020.01)
(58) Field of Classification Search
CPC ........ B25J 15/0466; E05B 9/04; G01D 13/20; G01D 13/28; G01D 11/28; G01D 7/00; G01D 7/005
USPC ...................................................... 74/490.06
See application file for complete search history.

(56) References Cited

U.S. PATENT DOCUMENTS 10,047,908 B1 * 8/2018 Bohle, II .............. B25J 15/0466
10,668,631 B2 * 6/2020 Rueb ................... B25J 17/0225

* cited by examiner

COMPENSATING ELEMENT WITH RELATIVE POSITION DISPLAY

This application claims priority under 35 U.S.C. § 119 to patent application no. DE 10 2021 204 730.0, filed on May 11, 2021 in Germany, the disclosure of which is incorporated herein by reference in its entirety.

BACKGROUND

The disclosure relates to a compensating element.

DE 10 2015 214 003 A1 discloses a compensating element which comprises a first and a second module. In a first operating state, the second module is connected firmly to the first module, a zero position thereby being defined. In a second operating state, a second module is supported resiliently on the first module so that the two modules are movable relative to one another.

DE 10 2015 219 332 A1 discloses a measuring system in which the relative position between a first and a second module can be measured in six degrees of freedom.

Furthermore, LED rings on devices for entertainment electronics, which display different operating states of the corresponding device by means of color LEDs, are known. Purely by way of example, the device "Amazon Alexa Echo Dot" may be mentioned.

SUMMARY

One advantage of the present disclosure is that the deflection state and the operating state of the compensating element can be displayed in an economical and user-friendly fashion on the compensating element itself. In this case, it is to be noted that a qualitative display, which can be read rapidly and easily, is of greater benefit to the user of the compensating element than a numerically accurate display. The precise numerical values are more relevant for documentation purposes and may if required be read out from the compensating element in an automated fashion. It is furthermore to be noted that the compensating element should be made lightweight and compact so that it can be moved rapidly and with high acceleration by a robot. In particular, conventional displays require a great deal of space when they are intended to be clearly readable. Furthermore, they tolerate large accelerations and vibrations poorly. With the type of display according to the disclosure, on the other hand, almost no additional space is needed. The luminous means may be fitted on a circuit board which is present in any case. The luminous means used can readily withstand large accelerations and oscillations.

According to the disclosure, it is proposed to provide a measuring system with which the relative position between the first and the second module can be measured, the first or the second module comprising an externally visible luminous surface, the luminous state of the luminous surface being dependent on the relative position measured by the measuring system. The aforementioned dependency between the measured relative position and the luminous state of the luminous surface preferably exists during operation of the compensating element, that is to say particularly when it is supplied with electrical current.

The first module is preferably movable relative to the first module in six degrees of freedom in the second operating state. The measuring system is preferably adapted to measure the relative position between the first and the second module in six degrees of freedom. The measured relative position is preferably related to the zero position. The luminous surface is preferably arranged on the first module. The second module preferably has a lower mass than the first module. The first module is for example fastened on a robot, with a tool or a gripper preferably being fastened on the second module. The measuring system is preferably configured according to DE 10 2015 219 332 A1. It comprises in particular six, preferably optical, distance meters, which are preferably fastened on the first module. These respectively lie opposite an assigned plane measuring face which is respectively arranged fixed on the second module. The measuring faces differ in respect of their location and their orientation, in such a way that the position of the second module relative to the first module can be calculated in six degrees of freedom from the six measured distances.

Advantageous refinements and improvements of the disclosure are specified below.

The luminous surface may annularly enclose the assigned first or second module. This leads to a large area on which a relatively large amount of information may be displayed. The assigned luminous means are consequently arranged in a plane so that they can be carried by a common circuit board.

The luminous surface may be formed by a separate first ring which consists of a transparent or opaque (https://de.wikipedia.org/wiki/Opazit%C3%A4t) material, a plurality of separate luminous means being arranged distributed over the circumference of the first ring next to an inner circumferential face of the first ring. The first ring is preferably rotationally symmetrical with respect to the midaxis, and it most preferably has a rectangular cross-sectional shape. It preferably consists of a plastic, in particular a light-scattering polycarbonate. An outer circumferential face of the first ring is preferably smooth, the desired opacity or light scattering being caused by the plastic itself. The luminous means are preferably LEDs, which may most preferably emit light in different colors. The luminous means are preferably distributed uniformly over the circumference of the first ring. The luminous surface is preferably formed by an outer circumferential face of the first ring.

The locking mechanism may comprise an electric motor, it being possible to switch between the first and the second operating state by means of the electric motor, a rotation axis of the electric motor being aligned parallel to the midaxis, the first ring enclosing the electric motor. The preferably separately configured first ring provides a natural dividing point at which the first module can be separated into two parts. The electric motor and the assigned driving electronics are consequently readily accessible for mounting. The rotation axis of the electric motor preferably coincides with the midaxis.

The first module may comprise a first and a second housing body, the first and the second housing body respectively being configured in the shape of a cup and facing one another with their open sides in the direction of the midaxis, the first ring being arranged between the first and the second housing body in the direction of the midaxis, the first and the second housing body being firmly connected to one another in the interior of the cavity formed in this way inside the first ring, with the second housing body facing toward the second module. The corresponding compensating element can be mounted easily. The desired firm connection between the first and the second housing body is substantially not interfered with by the first ring made of plastic. The first and the second housing body are preferably configured in the shape of cups with respect to the midaxis. They may respectively be composed of a plurality of individual parts. The first ring is preferably restrained between the first and the second housing body in the direction of the midaxis, most preferably by the use of sealing rings which consist of an elastomer.

A separate first plate which is firmly restrained between the first and the second housing body may be provided, the electric motor being fastened on the first plate, a drive spigot of the electric motor extending through the first plate. The first plate forms an element on which in the scope of the disclosure a plurality of components, inter alia the electric motor, may be supported directly. It can be mounted easily inside the first module and is connected very stiffly to the first housing body, which is preferably intended to be fastened on a robot or the like. This provides a very stiff connection between the robot and the compensating element. The first plate is preferably configured as a plane plate with a constant thickness. The electric motor preferably comprises gearing, which is firmly assembled with the rest of the electric motor so that they form a module that can be mounted as a whole. The drive spigot is accordingly formed by the gearing.

The spring mechanism may comprise at least three balls which are arranged distributed around the midaxis inside the first module, a second and a third ring which are arranged on the side of the at least three balls facing away from the second module and concentrically with respect to the midaxis being provided, the third ring being pressed against the at least three balls by means of a plurality of springs which respectively bear on the first module, the second ring being braced or not braced against the at least three balls depending on its rotational setting with respect to the midaxis, the second ring being arranged inside the third ring so that the first and the second ring can directly touch the at least three balls at different locations. In DE 10 2015 214 003 A1, the second and the third ring are functionally replaced by a common ring. The function separation now proposed of the springs and the locking has the advantage that the spring properties can actually be adapted very much better to the desired spring properties. In particular, it is now possible to use helical compression springs as springs, the arrangement, number and individual stiffness of which may be selected substantially arbitrarily in order to adjust the spring behavior. The spring mechanism preferably comprises precisely three balls. The balls are preferably arranged uniformly distributed around the midaxis. For each ball, the second module preferably comprises a ball seat which most preferably is configured in the shape of a circular cone. Preferably, the ball seat is supported in the zero position on the first module, in particular on the second housing body, against the force of the springs. Each ball seat is preferably connected firmly by means of an arm to the rest of the second module, the arm extending through the second housing body. The second ring preferably has a rotational drive connection to the electric motor, and is most preferably connected firmly to its drive spigot. The electric motor preferably comprises gearing so that it can exert a high torque on the drive spigot. The second ring is preferably rotatable with respect to the midaxis. The springs preferably bear directly on the first plate. Preferably, the second and the third ring respectively touch all the balls in the first operating state.

The at least three balls may respectively be guided linearly movably on the second housing body in the direction of the midaxis. This ensures that the second module returns to its zero position merely by the force of the springs, which act exclusively in the direction of the midaxis, when no external force is acting on the second module. The balls are preferably guided respectively on a separate guide ring made of steel, which is pressed into a second main part of the second housing body, the second main part most preferably consisting of aluminum. The first and/or the second main part is preferably produced respectively by a casting method, it respectively forming an outer circumferential face of the first or second housing body.

The second and the third ring may preferably be supportable on the first plate in the direction of the midaxis. The second ring preferably bears directly on the first plate. The third ring is preferably supported on the first plate by means of the springs. As already indicated above, the first plate can be fastened very stiffly on the superordinate robot, for which reason it is particularly suitable for supporting forces.

A first and a separate second circuit board which are arranged on opposite sides of the first plate in the direction of the midaxis may be arranged inside the first module, these being electrically connected to one another by means of at least one electrical line, the first circuit board being a constituent part of the measuring system, the second circuit board carrying a plurality of luminous means which are arranged next to the luminous surface. The second circuit board preferably carries a controller and/or a driver, by means of which the electric motor can be supplied with electrical current. The second circuit board is preferably configured in the shape of a ring, this enclosing the electric motor. The first circuit board is preferably arranged on the side of the first plate facing toward the second module. The first circuit board preferably carries a plurality of optical distance meters, by means of which a distance from the second module can respectively be measured. The second circuit board preferably has an opening for each of the aforementioned arms, through which the relevant arm extends.

BRIEF DESCRIPTION OF THE DRAWINGS

It is to be understood that the features mentioned above and those to be explained below may be used not only in the combination respectively specified but also in other combinations or separately, without departing from the scope of the present disclosure.

The disclosure will be explained in more detail below with the aid of the appended drawings, in which.

DETAILED DESCRIPTION

Figure 1:
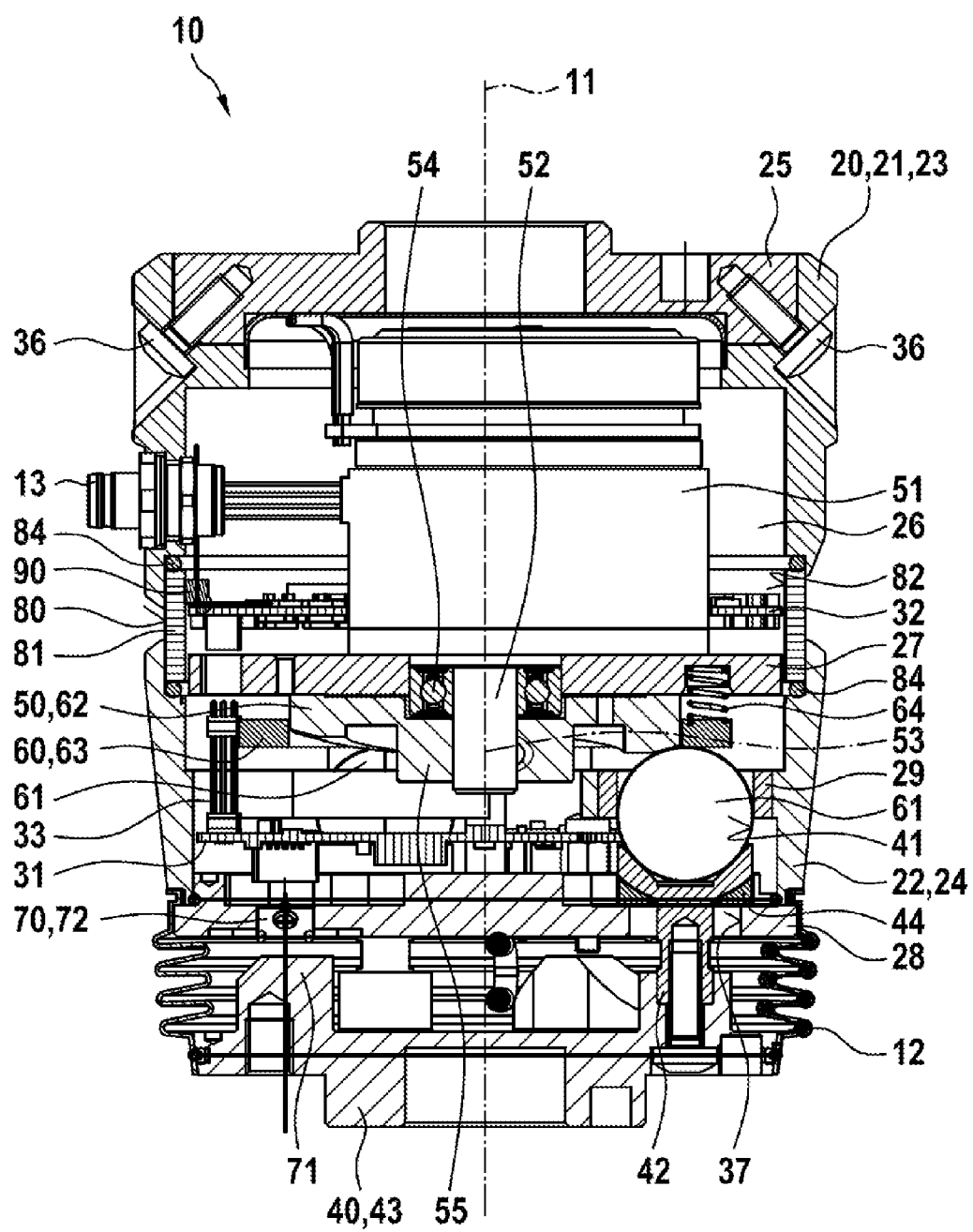
FIG. 1 shows a sectional view of the compensating element according to the disclosure.

FIG. 1 shows a sectional view of a compensating element 10 according to the disclosure. The corresponding section plane contains the midaxis 11, which extends through the center of a ball 61. The compensating element 10 comprises a first and a second module 20; 40, which in the first operating state represented in FIG. 1 are secured to one another. In the second operating state, the first and the second module 20; 40 are movable relative to one another, a variable gap between the first and the second module 20; 40 being covered by an annular bellows 12.

The first module 20, on the top in FIG. 1, comprises a first and a second housing body 21; 22, each of which is configured in the shape of a cup with respect to the midaxis 11. Their open sides face toward one another so that together they delimit a cavity 26.

The first housing body 21 comprises an annular first main part 23, which forms a section of the outer circumferential face of the first module 20. The first module 20 furthermore comprises a first fastening flange 25 which is firmly connected to the first main part 23 by means of a plurality of screws 36 that are arranged obliquely with respect to the midaxis 11 and forms the bottom of the aforementioned cup shape. The compensating element 10 is preferably produced in a plurality of variants which differ in respect of the shape of the first and/or second fastening flange 25; 43, so that the compensating element may be used for different robots and different grippers.

The second housing body 22 comprises an annular second main part 24 and a second plate 28. The second main part 24 forms a section of the outer circumferential face of the first module 20. The second plate 28 forms the bottom of the aforementioned cup shape.

A first ring 81, the outer circumferential face of which forms a luminous surface 80, is received in the direction of the midaxis 11 between the first and the second main part 23; 24. The first ring 81 extends with a constant rectangular cross-sectional shape circularly around the midaxis 11. It preferably consists of a light-scattering polycarbonate. On its two end sides facing in the direction of the midaxis 11, a sealing ring 84 is respectively arranged toward the first and second main part 23; 24, respectively.

The first ring 81 encloses a first plate 27, which is arranged statically inside the first module 20. An electric motor 51, which comprises gearing, is firmly connected to the first plate 27, its drive spigot 52 extending through the first plate. The rotation axis 53 of the electric motor 51 coincides with the midaxis 11 of the compensating element. Because of the gearing, the rotation axis 53 of the electric motor 51 is arranged somewhat off-center on the electric motor 51 itself. The drive spigot 52 is already mounted rotatably inside the electric motor 51, and it is additionally provided with a further radial rolling bearing 54 that is received in the first plate 27. In this way, the forces acting on the second ring 62 are intended to be supported optimally. The second ring 62 is provided integrally with a hub 55, which is firmly connected to the drive spigot 52 (cf. threaded pin 56 in FIG. 2). In the direction of the midaxis 11, the second ring 62 is supported directly on the first plate 27.

The electric motor 51 is enclosed by an annular second circuit board 32. The second circuit board 32 carries a plurality of luminous means 90, which are arranged uniformly distributed around the midaxis 11. Each luminous means 90 is configured in the form of an LED which can emit in a plurality of colors. The number of luminous means 90 is selected to be so large that, when all the luminous means 90 are shining with equal strength and with the same color, the impression of a continuous color ring is obtained on the luminous surface 81. In this case, the light-scattering effect of the first ring 81 is utilized.

Furthermore, the second circuit board 32 carries a controller or driver, with which current can be applied to the electric motor 51. The second circuit board 32 can be connected by means of the electrical terminal 13 on the first base body 21 to a control, all functions of the compensating element 10 being drivable by means of this connection. The current supply of the compensating element 10 also takes place via the terminal 13.

A first circuit board 31 is furthermore provided, which is arranged on the opposite side of the first plate 27 with respect to the second circuit board 32, that is to say inside the second housing body 22. The first circuit board 31 carries the electronic components of the measuring system 70, with which the relative position between the first and the second module can be measured. The measuring system 70 is configured according to DE 10 2015 219 332 A1. The entire content of DE 10 2015 219 332 A1 is referenced and included in the content of the present application. The measuring system 70 comprises in total six optical distance meters 72, which are respectively carried by the first circuit board 31. The distance meters 72 are combined into three pairs, the three pairs being arranged distributed as an angular spacing of 120° around the midaxis 11. Each aforementioned pair is assigned a prism 71, these respectively being formed in the present case integrally with the second fastening flange 43. Each prism 71 forms two plane measuring faces (No. 73 in FIG. 2), which are arranged inclined by 90° with respect to one another. Each distance meter 72 is assigned a measuring face, in the zero position of the compensating element 10 its measuring direction being aligned perpendicularly to the assigned measuring face and centrally with respect thereto. By means of the six measured distance values, the relative position between the first and the second module can be calculated in six degrees of freedom. To this end, a nonlinear system of equations needs to be solved, which is preferably done with a gradient descent method. The corresponding computer in the form of a microcontroller is preferably received on the first circuit board 31.

The first circuit board 31 is connected by means of electrical lines 33 to the second circuit board 32. The first and the second circuit board 31; 32 are respectively received statically inside the first module 20. In the region of the balls 61, the first circuit board 31 is provided with openings.

The locking mechanism 60 in the present case comprises three balls 61, which are arranged uniformly distributed around the midaxis 11. Parallel to the midaxis 11, each ball 61 is guided movably by means of a guide ring 29. The guide ring 29 consists of steel, it being pressed into a matched recess in the second main part 24, which consists of aluminum. In the axial direction, the position of the guide ring 29 is secured with a form fit. The separate guide ring 29 in this case prevents the wear which would occur if the balls 61 were guided directly on the second main part 24.

In FIG. 1 top, that is to say toward the first plate 27, each ball bears on the second and on the third ring 62; 63. The second and the third ring 62; 63 are arranged concentrically with respect to the midaxis 11, the second ring 62 being arranged inside the third ring 63 so that the second and the third ring 62; 63 directly touch a ball 61 at different locations.

The third ring 63 extends with a constant rectangular cross-sectional shape around the midaxis 11. It is supported by three springs 64 on the first plate 27. The springs 64 are configured as helical compression springs, these being arranged uniformly distributed around the midaxis 11. The springs 64 are received at both ends in matched recesses of the third ring 63 or of the second plate 28, respectively. They are in this case arranged in the direction of the midaxis 11 approximately flush with an assigned ball 61.

The second ring 62 bears with a plane face directly on a plane surface of the first plate 27 in such a way that it can move by sliding. In the direction of the midaxis 11, it has a thickness which changes over the circumference of the second ring 62 in three periods between a minimum and a maximum. When the three thickness maxima bear on the balls 61, the first operating state is set up, the compensating element being locked. When the three thickness minima are arranged in the region of the balls 61, the second operating state is set up. The switching between the two operating states is carried out by rotating the second ring 62 by means of the electric motor 51.

The balls 61 lie on an assigned ball seat 41 in the shape of a circular cone, regardless of which operating state the compensating element 10 is in. The ball seat 41 is firmly connected, in particular screwed, to the second fastening flange 43 by means of an integral arm 42. The arm 42 in this case extends through a bore 37 in the second plate 28, the ball seat 41 bearing with a dampening ring 44 at the edge of the bore 37 on the second plate 28 when the compensating element 10 is in the first operating state, or the zero position. In the second operating state, this contact may be eliminated by applying a force to the second fastening flange 43. Depending on the direction of this force, at least one ball 61 moves against the force of the respectively assigned spring 64 toward the first plate 27. In the second operating state, the second module 40 is thus resiliently supported on the first module 20. When an external force is not applied to the second module 40, the spring forces in cooperation with the guide rings 29 have the effect that the second module 40 springs back into a defined zero position. In this zero position, it may be firmly clamped by the second ring 62 in order to set up the first operating state.

Figure 2:
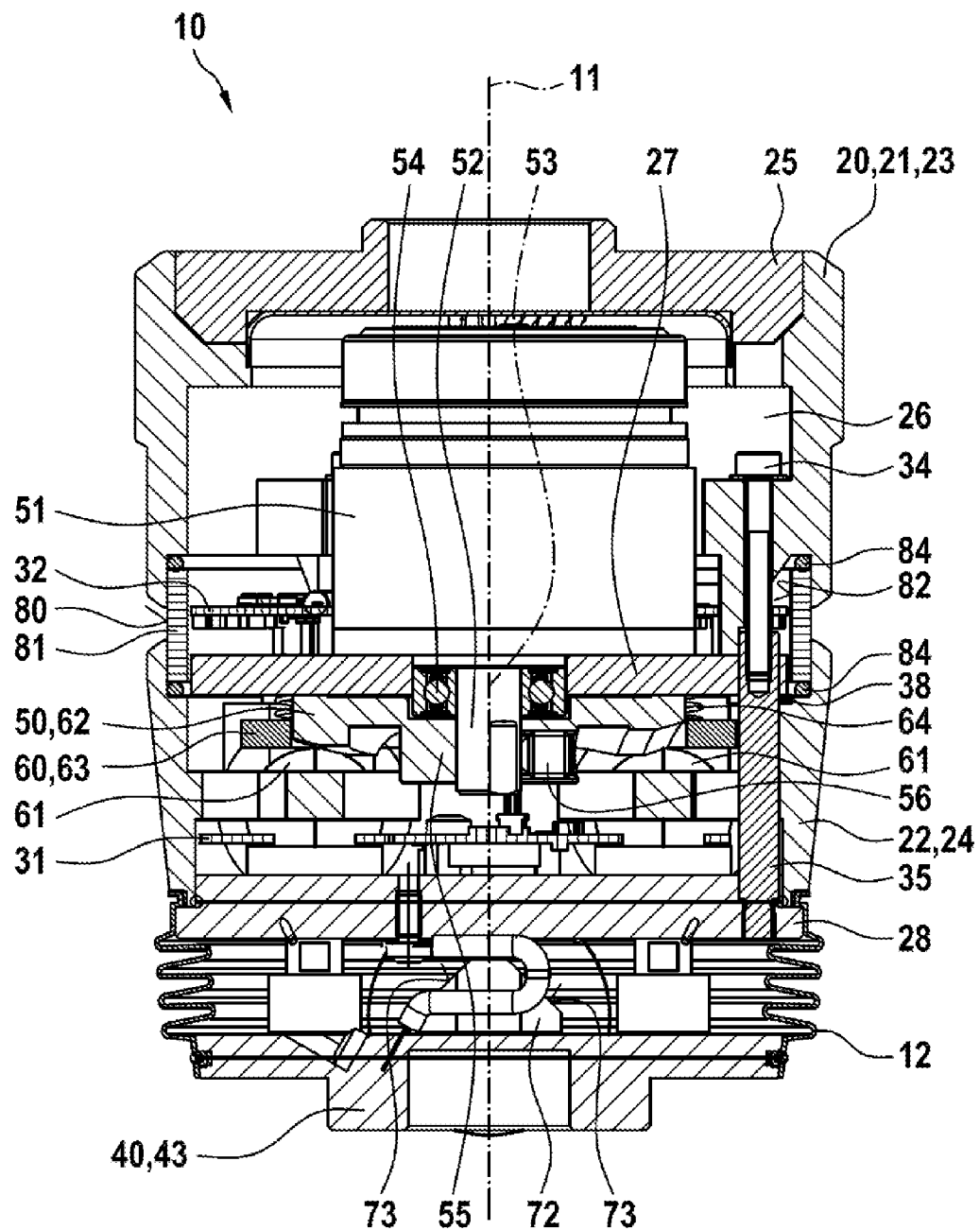
FIG. 2 shows a further sectional view of the compensating element according to FIG. 1.

FIG. 2 shows a further sectional view of the compensating element 10 according to FIG. 1. The section plane likewise contains the midaxis 11, it being rotated through 90° relative to FIG. 1. Consequently, all three balls 61 are arranged outside the section plane.

In FIG. 2, the way in which the various parts of the first module 20 are screwed together may be seen. To this end, the screw 34 and the assigned bolt 35 are used, three of each of which are respectively present, the corresponding pairs being arranged uniformly distributed over the circumference of the compensating element 10. The bolt 35 that is parallel to the midaxis 11 is screwed with a male thread into the second plate 28. It extends through the first plate 27 with a cylindrical mating surface, so that the first plate 27 is accurately aligned. The screw 34 parallel to the midaxis 11 extends through the first main part 23, it being screwed into a female thread of the bolt 35. In this way, the first main part 23 is braced against the first plate 27. The first plate 27 bears via at least one spacer plate 38 on the second main part 24, the latter in turn bearing directly on the second plate 28 so that the flow of force of the screw 34 is closed. In order that the corresponding clamping force is transmitted only to a small extent via the first ring 81, the latter is held between two sealing rings 84, and it bears with its luminous face 80 section-wise internally on the first and second main part 23; 24, respectively.

FIG. 2 furthermore shows the firm connection between the second ring 62 and the drive spigot 52. Screwed into the hub 55 of the second ring 62 transversely with respect to the midaxis 11, there is a threaded pin 56, the latter being clamped against a flat area on the drive spigot 52.

FIG. 2 furthermore shows a prism 71 in a side view. The two corresponding plane measuring faces 73 are accordingly aligned perpendicularly to the section plane of FIG. 2. They intersect on an imaginary straight line, which in turn intersects the midaxis 11 at a right angle. Considered in the direction of view of FIG. 2, the two measuring faces 73 assigned to one another are arranged mirror-symmetrically with respect to the midaxis 11.

Figure 3:
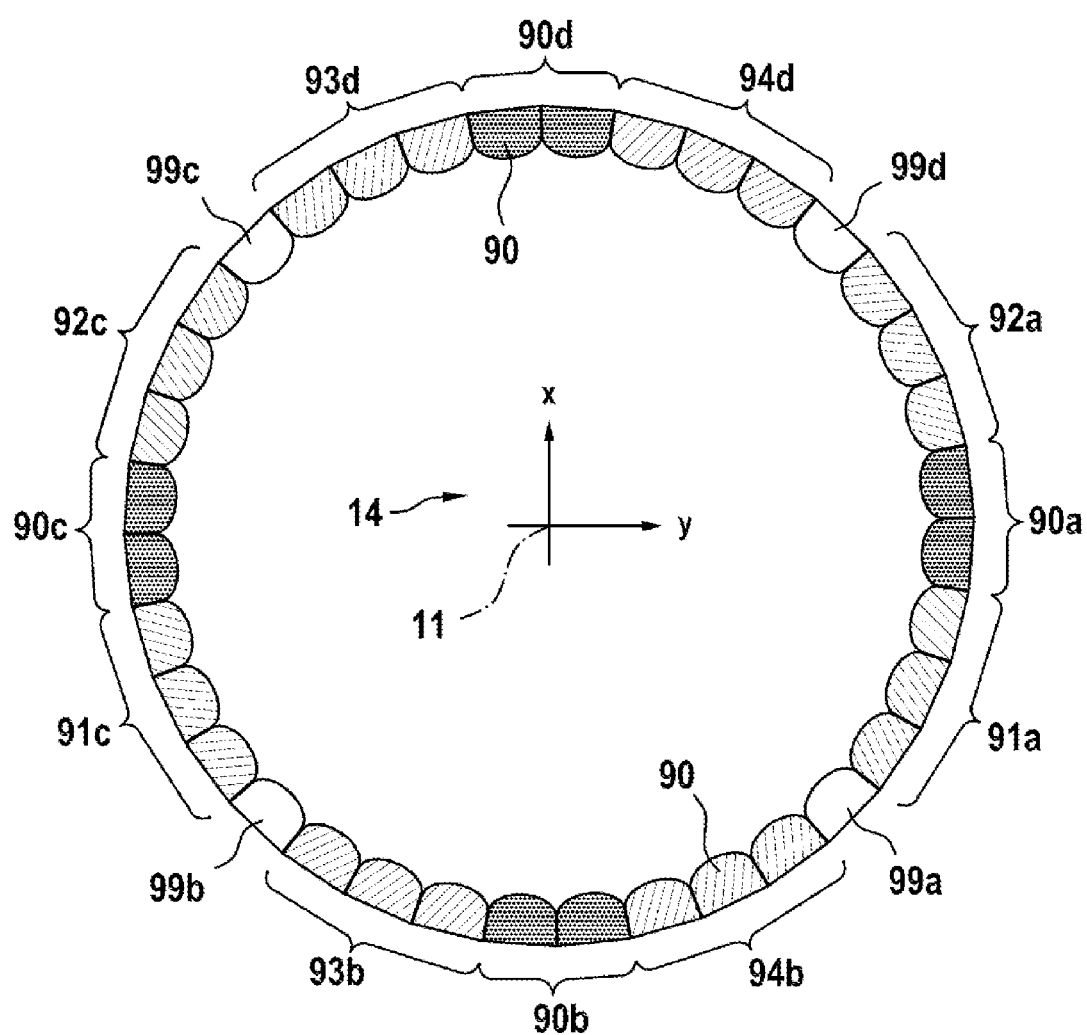
FIG. 3 shows a rough schematic plan view of the luminous means.

FIG. 3 shows a rough schematic plan view of the luminous means 90. The direction of view is directed parallel to the midaxis 11 from the first module onto the second module. The midaxis 11 defines a coordinate system 14, the horizontal axis in FIG. 3 being the Y axis, the vertical axis in FIG. 3 being the X axis. The Z axis coincides with the midaxis 11. In the zero position, Z=0. In a deflected setting, the spring mechanism explained above allows only positive values for Z.

In the present case, 36 luminous means 90 are arranged uniformly distributed around the midaxis 11. This number was selected because it contains the prime factor 2 twice and the prime factor 3 twice. All the luminous means 90 are configured in the same way as one another, these being color LEDs. They can shine in different colors and with different luminosities.

A first display mode, with which the relative position between the first and the second module can be displayed, will be explained below. Four groups of luminous means 90 offset by 90°, which are respectively denoted by letters a, b, c, d, are indicated in FIG. 3. Groups a and c are assigned to the X axis. The luminous means 91*a*; 91*c* in this case indicated a translation of the second module toward negative X values. The greater the corresponding displacement, the more the luminous means 91*a*; 91*c* shine. This principle is also referred to as a "bar graph display". The luminous means 92*a*; 92*c* similarly indicate a translation of the second module toward positive X values. The luminous means 93*b*; 93*d* similarly indicate a translation of the second module toward negative Y values. The luminous means 94*b*; 94*d* similarly indicate a translation of the second module toward positive Y values. In all cases explained above, the displayed axial direction coincides with the position of the assigned luminous means. The length of the bar graph preferably increases in the direction of the relevant translation.

The translation in the Z direction is indicated by the luminous means 90*a*; 90*b*; 90*c*; 90*d*. To this end, only two luminous means are respectively provided. Since this is too few for a bar graph display, the translation is displayed with color coding. Green corresponds to the translation zero, yellow corresponds for example to a displacement of 50% of the maximum Z travel. Red corresponds for example to a displacement of 100% of the maximum Z travel. The luminous means 90 used in this case allow a substantially continuous change of the displayed color, so that arbitrary intermediate values may also be displayed.

The luminous means 99*a*; 99*b*; 99*c*; 99*d* are not used in the first display mode, and preferably do not shine.

In the first display mode, only translations are displayed. In a second display mode, rotations about the X and Y axes can additionally be displayed. To this end, the bar graph display of the assigned translation axis is color-coded, in a similar way to the method explained for the Z translation.

In the first and second display modes, the display may relate to the zero position. It is, however, also conceivable for the display to be based on another zero point. This is expedient, for example, when the intention is to check whether a component complies with particular tolerances. The compensating element then carries a probe, for example on the second module, the first module of the compensating element being moved by means of a buckling-arm robot. The workpiece location to be tested is sampled with the probe, a setpoint deflection of the compensating element being set up. This then defines the zero point of the display. If the actual deflection of the compensating element deviates from the setpoint deflection, the corresponding luminous means 90 shine and thus display a tolerance deviation.

A third display mode signals that the compensating element has been connected to the voltage supply, the computer inside the compensating element being started up. To this end, any rigidly predetermined light pattern of the luminous means 90 may be used, which may if desired vary in the course of time.

A fourth display mode indicates a fault of the compensating element. To this end, for example, all the luminous means 90 shine red.

A fifth display mode indicates the relative position between the first and second modules in the manner of a spirit level. In this case, for example, only the two directly neighboring luminous means 90 which are assigned to the lowermost location of the second module shine.

In a sixth display mode, an operating status of the compensating element may be displayed. To this end, for example, particular luminous means 90 are assigned to particular sensors inside the compensating element. If the corresponding sensor is functional, the corresponding luminous means 90 shine green, if its function is faulty, the corresponding luminous means 90 shine red. The compensating element is thus functioning properly when all the LEDs 90 shine green.

REFERENCES

- 10 compensating element
- 11 midaxis
- 12 bellows
- 13 electrical terminal
- 14 coordinate system
- 20 first module
- 21 first housing body
- 22 second housing body
- 23 first main part
- 24 second main part
- 25 first fastening flange
- 26 cavity
- 27 first plate
- 28 second plate
- 29 guide ring
- 31 first circuit board
- 32 second circuit board
- 33 electrical line
- 34 screw
- 35 bolt
- 36 screw
- 37 bore
- 38 spacer plate
- 40 second module
- 41 ball seat
- 42 arm
- 43 second fastening flange
- 44 dampening ring
- 50 locking mechanism
- 51 electric motor
- 52 drive spigot
- 53 rotation axis of the electric motor
- 54 radial rolling bearing
- 55 hub
- 56 threaded pin
- 60 spring mechanism
- 61 ball
- 62 second ring
- 63 third ring
- 64 spring
- 70 measuring system
- 71 prism
- 72 optical distance meter
- 73 measuring face
- 80 luminous surface
- 81 first ring
- 82 inner circumferential face of the first ring
- 84 sealing ring
- 90 luminous means
- 90*a* luminous means Z
- 90*b* luminous means Z
- 90*c* luminous means Z
- 90*d* luminous means Z
- 91*a* luminous means X−
- 91*c* luminous means X−
- 92*a* luminous means X+
- 92*c* luminous means X+
- 93*b* luminous means Y−
- 93*d* luminous means Y−
- 94*b* luminous means Y+
- 94*d* luminous means Y+
- 99*a* unused luminous means
- 99*b* unused luminous means
- 99*c* unused luminous means
- 99*d* unused luminous means

What is claimed is:

1. A compensating element, comprising:
   a first module;
   a second module, wherein (i) the compensating element has a midaxis, and (ii) the first module and the second module are arranged at least partially next to one another in the direction of the midaxis;
   a locking mechanism configured to be switched between a first operating state and a second operating state, wherein (i) the first module is fixedly connected to the second module in the first operating state which defines a zero position between the first module and the second module, and (ii) the first module and the second module are connected to one another in the second operating state by a spring mechanism in such a way that the first module and the second module are movable relative to one another; and
   a measuring system configured to measure the relative position between the first and the second module,
   wherein one of the first module and the second module includes an externally visible luminous surface, and
   wherein a luminous state of the luminous surface is dependent on the relative position measured by the measuring system.

2. The compensating element according to claim 1, wherein the luminous surface annularly encloses the one of the first module and the second module.

3. The compensating element according to claim 1, wherein
   the luminous surface is formed by a first ring which includes a transparent or opaque material, and
   a plurality of luminous mechanisms are arranged distributed over a circumference of the first ring next to an inner circumferential face of the first ring.

4. The compensating element according to claim 3, wherein:
   the locking mechanism includes an electric motor,
   the electric motor is configured to switch the locking mechanism between the first operating state and the second operating state,
   a rotation axis of the electric motor is aligned parallel to the midaxis, and
   the first ring encloses the electric motor.

5. The compensating element according to claim 4, wherein:

the first module includes a first housing body and a second housing body, the first housing body and the second housing body are (i) respectively configured in the shape of a cup, and (ii) face one another with their open sides in the direction of the midaxis, the first ring is arranged between the first housing body and the second housing body in the direction of the midaxis, the first housing body and the second housing body are fixedly connected to one another in an interior of a cavity formed in this way inside the first ring, and the second housing body faces toward the second module.

6. The compensating element according to claim 5, wherein:

the first plate is fixedly restrained between the first housing body and the second housing body, the electric motor is fastened to the first plate, the electric motor includes a drive spigot, and the drive spigot extends through the first plate.

7. The compensating element according to claim 6, wherein:

the spring mechanism includes at least three balls which are arranged distributed around the midaxis inside the first module, a second ring and a third ring are arranged on the side of the at least three balls facing away from the second module and concentrically with respect to the midaxis, the third ring is pressed against the at least three balls by a plurality of springs which respectively bear on the first module, the second ring is selectively braced or not braced against the at least three balls depending on its rotational setting with respect to the midaxis, and the second ring is arranged inside the third ring so that the first ring and the second ring directly touch the at least three balls at different locations.

8. The compensating element according to claim 7, wherein the at least three balls are respectively guided linearly movably on the second housing body in the direction of the midaxis.

9. The compensating element according to claim 7, wherein the second ring and the third ring are supported on the first plate in the direction of the midaxis.

10. The compensating element according to claim 9, wherein:

a first circuit board and a second circuit board are arranged inside the first module on opposite sides of the first plate in the direction of the midaxis, the first circuit board and the second circuit board are connected to one another by at least one electrical line, the measuring system includes the first circuit board, and the second circuit board carries the plurality of luminous mechanisms so that they are arranged next to the luminous surface.

\* \* \* \* \*